(12) United States Patent
Fedders et al.

(10) Patent No.: US 9,444,865 B2
(45) Date of Patent: *Sep. 13, 2016

(54) DISTRIBUTING INTELLIGENCE ACROSS NETWORKS

(71) Applicant: Intel Corporation, Santa Clara, CA (US)

(72) Inventors: Jeffrey G. Fedders, Westminster, CO (US); Matthew Adiletta, Bolton, MA (US); Valerie J. Young, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/583,485

(22) Filed: Dec. 26, 2014

(65) Prior Publication Data

US 2015/0113038 A1    Apr. 23, 2015

Related U.S. Application Data

(63) Continuation of application No. 14/267,461, filed on May 1, 2014, which is a continuation of application No. 13/585,816, filed on Aug. 14, 2012, now Pat. No. 8,737,212, which is a continuation of application No. 11/821,097, filed on Jun. 21, 2007, now Pat. No. 8,243,596.

(51) Int. Cl.
*H04L 29/06* (2006.01)
*H04L 29/08* (2006.01)

(52) U.S. Cl.
CPC .............. *H04L 65/60* (2013.01); *H04L 67/06* (2013.01); *H04L 67/10* (2013.01); *H04L 67/28* (2013.01); *H04L 67/2823* (2013.01); *H04L 67/2842* (2013.01)

(58) Field of Classification Search
CPC ........... H04L 67/2823; H04L 67/2842; H04L 67/28; H04L 47/70; H04L 47/72; H04L 47/74; H04L 47/78; H04L 47/80
USPC .................... 370/230; 725/86, 87, 91, 93, 94
See application file for complete search history.

(56) References Cited

U.S. PATENT DOCUMENTS

| | | | |
|---|---|---|---|
| 6,886,029 B1 | 4/2005 | Pecus et al. | |
| 6,968,389 B1 | 11/2005 | Menditto et al. | |
| 6,990,514 B1 * | 1/2006 | Dodrill | G06F 17/30914 707/E17.124 |
| 7,343,614 B1 | 3/2008 | Hendricks et al. | |
| 7,436,955 B2 | 10/2008 | Yan et al. | |
| 8,024,808 B1 * | 9/2011 | Gleichauf | H04L 47/762 713/153 |
| 8,121,288 B2 | 2/2012 | Xie et al. | |
| 8,243,596 B2 | 8/2012 | Fedders et al. | |
| 8,407,204 B2 * | 3/2013 | Carver | G06F 17/30864 707/709 |

(Continued)

OTHER PUBLICATIONS

Office Action received for U.S. Appl. No. 11/821,097, mailed on Aug. 12, 2011, 22 pages.

(Continued)

*Primary Examiner* — Chuong T Ho
(74) *Attorney, Agent, or Firm* — Christopher K. Gagne

(57) ABSTRACT

Methods and apparatus relating to distribution of intelligence across a network are described. In one embodiment, one or more content processors may be provided at the edge of a computer network (e.g., prior to a point where data is aggregated or routed by the network). Other embodiments are also disclosed.

37 Claims, 5 Drawing Sheets

(56) References Cited

U.S. PATENT DOCUMENTS

| | | | |
|---|---|---|---|
| 8,737,212 B2* | 5/2014 | Fedders | H04L 67/2823 370/230 |
| 8,874,694 B2* | 10/2014 | Wei | H04L 41/0816 709/219 |
| 9,264,335 B2* | 2/2016 | Wei | H04L 41/0816 |
| 2001/0055319 A1 | 12/2001 | Quigley et al. | |
| 2002/0026645 A1 | 2/2002 | Son et al. | |
| 2003/0028890 A1* | 2/2003 | Swart | H04N 7/17318 725/91 |
| 2004/0223611 A1 | 11/2004 | Yan et al. | |
| 2005/0027863 A1 | 2/2005 | Talwar et al. | |
| 2006/0047767 A1* | 3/2006 | Dodrill | G06F 17/30914 709/206 |
| 2007/0162942 A1* | 7/2007 | Hamynen | G06F 3/147 725/105 |
| 2007/0162945 A1 | 7/2007 | Mills | |
| 2007/0204311 A1 | 8/2007 | Hasek et al. | |
| 2008/0092176 A1 | 4/2008 | Raftelis et al. | |
| 2008/0201747 A1 | 8/2008 | Cooper | |
| 2008/0275839 A1* | 11/2008 | Zabawskyj | H04W 4/02 |
| 2009/0034721 A1 | 2/2009 | Yan et al. | |
| 2011/0044354 A1* | 2/2011 | Wei | H04L 41/0816 370/468 |
| 2013/0275602 A1* | 10/2013 | Havekes | H04L 41/0893 709/226 |
| 2015/0012653 A1* | 1/2015 | Wei | H04L 41/0816 709/224 |

OTHER PUBLICATIONS

Office Action received for U.S. Appl. No. 11/821,097, mailed on May 19, 2010, 15 pages.
Office Action received for U.S. Appl. No. 11/821,097, mailed on Feb. 17, 2011, 15 pages.
Office Action received for U.S. Appl. No. 11/821,097, mailed on Sep. 16, 2009, 13 pages.
Notice of Allowance received for U.S. Appl. No. 11/821,097, mailed on Apr. 27, 2012, 5 pages.
Response to Final Office Action received for U.S. Appl. No. 11/821,097, filed Jan. 12, 2012, 10 pages.
Response to Final Office Action received for U.S. Appl. No. 11/821,097, filed Aug. 23, 2010, 7 pages.
Response to Non-Final Office Action received for U.S. Appl. No. 11/821,097, filed Feb. 19, 2010, 6 pages.
Response to Non-Final Office Action received for U.S. Appl. No. 11/821,097, filed May 23, 2011, 7 pages.
Office Action received for U.S. Appl. No. 13/585,816, mailed on Oct. 2, 2013, 18 pages.
Office Action received for U.S. Appl. No. 13/585,816, mailed on Mar. 8, 2013, 14 pages.
Office Action received for U.S. Appl. No. 13/585,816, mailed on Jul. 22, 2013, 16 pages.
Office Action Received for U.S. Appl. No. 13/585,816, mailed on May 14, 2013, 18 pages.
Notice of Allowance Received for U.S. Appl. No. 13/585,816, mailed on Jan. 17, 2014, 9 pages.
Response to Final Office Action received for U.S. Appl. No. 13/585,816, filed Jul. 9, 2013, 9 pages.
Response to Final Office Action received for U.S. Appl. No. 13/585,816, filed Nov. 20, 2013, 10 pages.
Response to Non-Final Office Action received for U.S. Appl. No. 13/585,816, filed Sep. 9, 2013, 10 pages.
Response to Non-Final Office Action received for U.S. Appl. No. 13/585,816, filed May 1, 2013, 8 pages.
Office Action received in U.S. Appl. No. 14/267,461, dated Dec. 17, 2015 (and related attachments), 24 pages.

* cited by examiner

DISTRIBUTING INTELLIGENCE ACROSS NETWORKS

CROSS-REFERENCE TO RELATED APPLICATIONS

This Application is a continuation (and claims the benefit of priority under 35 U.S.C. §120) of U.S. application Ser. No. 14/267,461, filed on May 1, 2014 and entitled DISTRIBUTING INTELLIGENCE ACROSS NETWORKS, which application is a continuation of U.S. patent application Ser. No. 13/585,816, filed on Aug. 14, 2012, now issued as U.S. Pat. No. 8,737,212, which application is a continuation of U.S. patent application Ser. No. 11/821,097, filed on Jun. 21, 2007, now issued as U.S. Pat. No. 8,243,596. The disclosures of the prior Applications are considered part of and are incorporated by reference in the disclosure of this Application.

BACKGROUND

The present disclosure generally relates to the field of computing. More particularly, an embodiment of the invention relates to distributing intelligence across networks.

Introduction of faster Internet service has enabled some end-users to access data at speeds and bandwidths that rival or exceed the traditional T-carrier 1 digital transmission line (T-1) connections. Most on-demand services, however, rely on buffering of data. That is, the corresponding data is downloaded and stored for future access. For example, to watch a movie, a user may have to download a movie first. The buffering is generally required because bandwidth over broadband connections may not be guaranteed to ensure a satisfactory quality of service (QoS) outcome. Also, keeping the buffered data secure may not be an easy task, possibly resulting in data security vulnerabilities, in part, because the content is stored locally on an end-user's computer and more prone to unauthorized access.

For example, some traditional network architectures may take advantage of statistical multiplexing of subscribers. More particularly, content services may be processed at a remote centralized content processing node and then pushed across a best effort network. For some Internet protocol (IP) services, this deployment model results in time-shifted content to be delayed, dropped, and retransmitted. As more services and content are added, this model will bottleneck and cause congestion at the edge of the network, for example, causing dropped packets and unacceptable jitter. Accordingly, such best effort models will not be adequate for latency sensitive content and functions, e.g., because there is no guaranteed QOS with such approaches.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Some of the embodiments discussed here (such as the embodiments discussed with reference to FIGS. 1-5) may provide real time and/or low-latency computing for data services, including, for example, data services over Internet protocol (IP). In accordance with an embodiment, compute resources may be distributed more effectively in local or global networks. For example, compute resources may be provided closer to the clients or subscribers. Also, by distributing compute utility services in a grid fashion in one embodiment, e.g., at the edge of the network, applications may become relatively more viable for real time delivery to the clients due to the low-latency capability of the localized compute and/or storage resources. Such techniques may further enhance security of data that may otherwise have to be stored locally on an end-user's computer and more prone to unauthorized access. As discussed herein, the term "grid" or "grid computing" generally refers to configurations where one or more computing resources (such as a general-purpose computer) are shared (e.g., dynamically or statically) between different subscribers to perform one or more tasks or portions of tasks. As discussed herein, at least some of the embodiments that relate to provision of compute resources at or near the edge of the network (e.g., relatively closer to clients and/or subscribers) may be generally referred to as Network Distributed Intelligence (NDI).

Figure 1:
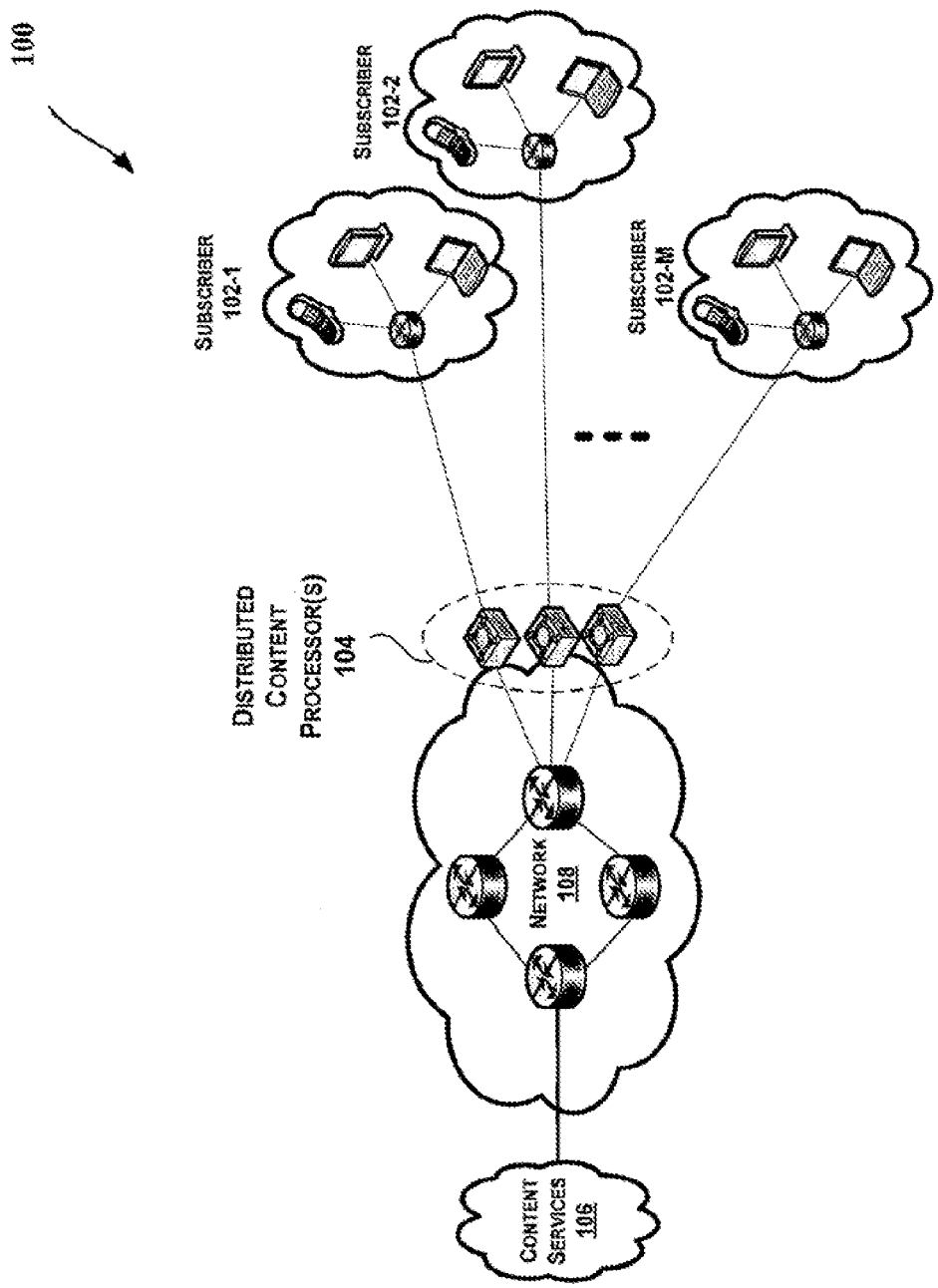
FIG. 1 illustrates a block diagram of a network architecture with distributed intelligence, according to an embodiment.

More particularly, FIG. 1 illustrates a block diagram of a network architecture 100 distributed intelligence, according to an embodiment. The distributed edge intelligent network element may terminate, proxy, or pass through a variety of protocols including for example session initiation protocol (SIP) (e.g., for control plane functions), real time streaming protocol (RTSP) (e.g., for data plane functions or IP for data transfer functions), etc. The network element may be further positioned to terminate or convert asynchronous transfer mode (ATM) packets to IP packets or vise versa. In addition, the edge node may be architected to perform content processing of incoming and outgoing streams such as encryption/decryption and encoding/decoding of different types of protocols, such as H.264, Motion Picture Experts Group (MPEG), extensible markup language (XML), asynchronous Javascript® and XML (AJAX), etc.

The network architecture 100 may include one or more subscribers 102-1 through 102-M (which may be collectively referred to herein as "subscribers 102 or more generally "subscriber 102") that are coupled through one or more distributed content processors 104 to content services 106 via a network 108. In various embodiments, the content services may provide data relating to one or more of advertising, audio content, video content, billing data, security application(s), health monitoring, IP television (IPTV), gaming, text messaging, voicemail, pictures, bar codes, radio frequency identifiers (RFIDs), XML, AJAX, other data files, source code, etc.

Furthermore, content services 106 may come in various forms with various size packets (in an embodiment, ranging from 8 bits (e.g., voice) to jumbo size packets). Blending of these various types of packets has become a security, control, and latency intensive challenge. Provision of multiple content processors 104 at the edge of the network 108 (e.g., prior to the point of aggregation and routing) may enable dynamic control of the blending of the data plane applications and control where latency critical or efficient use of bandwidth is required.

In accordance with some embodiments, the architecture 100 represents a distributed content processing network with NDI. In an embodiment, this architecture will reduce the latency and/or congestion problems associated with bottlenecks and best effort QoS. In addition, the network may be scaled to the amount of services rather than the number of subscribers. For example, a generic service may be transmitted to the edge of the network and may be customized via the distributed content processors 104. This allows individualization of services from a generic service to create a customized targeted service.

For example, as shown in FIG. 1, a parallel compute engine (e.g., content processor(s) 104) may be provided at the edge of a network 108 (where real time events may be critical and processing capabilities or needs may be increasing due to content services and the aggregation or blending of multiple services). Moreover, instead of aggregating and routing to a centralized data center (not shown), generic computers may be placed before the aggregation to reduce the network bandwidth and QoS requirements. Furthermore, such architecture may provide a new type of compute resources for providers to develop real-time services that are not achievable with the aggregation/routing topology. Accordingly, by placing central processing units (e.g., content processor(s) 104) at the edge of the network 108 (e.g., prior to aggregation and routing) real-time services may be provisioned more efficiently. Furthermore, binding these content processors 104 in a grid fashion across the network 108 may allow applications to share multiple resources located virtually anywhere, even at extreme remote locations. Grid configurations may also promote the ability to share computes across one or more nodes, for example, if one user needs more computes while an adjacent user has free computes. In an embodiment, the compute resource transfer may be at the lowest latency point in the network, e.g., nearest to the client requesting additional computes but still accessible. In one instance, distance between the content processor and each of the subscribers may be determined based on the media choice. For example, in one embodiment, this distance may be in the range of about 100 m and 100 km for fiber, 100 m and 10 km for copper, or 100 m and 4 km for wireless. Other ranges are also possible.

Figure 2:
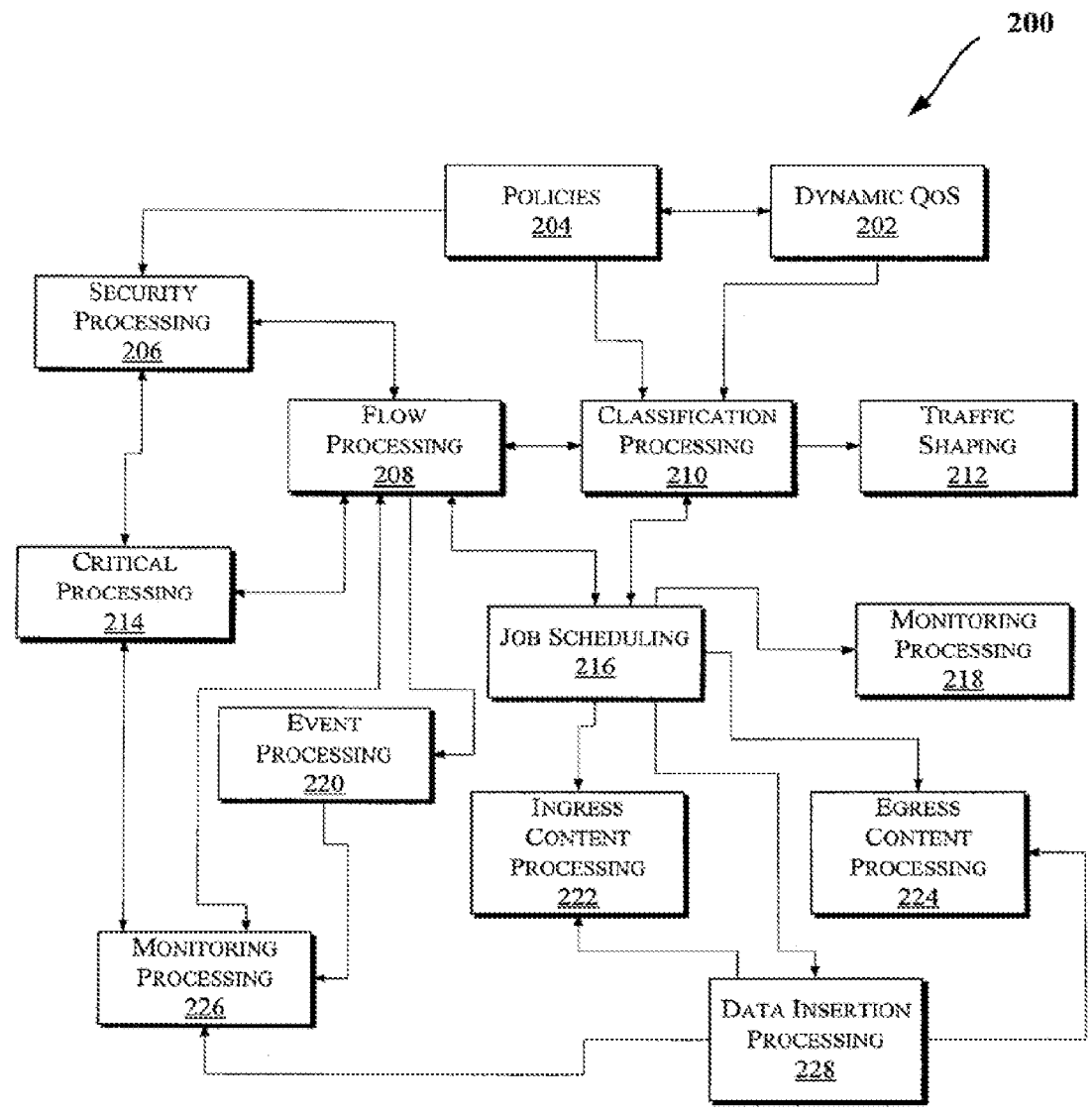
FIG. 2 illustrates a block diagram of a distributed latency compute control environment in accordance with an embodiment.

FIG. 2 illustrates a block diagram of a distributed latency compute control environment 200 in accordance with an embodiment. Any of the processors (or processor cores) discussed herein (e.g., with reference to FIGS. 1 and 3-5) may perform one or more of the tasks illustrated in FIG. 2, or a portion of the tasks shown. Also, the control or data processes may be shared across distributed compute units (such as processors 104 of FIG. 1) in some embodiments. Hence, services may be performed by various logic discussed herein.

In an embodiment, compute resource transfers may be at the lowest latency point in the network, e.g., nearest to the client (such as subscribers 102 of FIG. 2) requesting additional computing resources. In one embodiment, the response time of the content processor to a request by one of the subscribers may be between about 1 ms and about 400 ms. Other response times may also be possible. Also, the delay associated with transmitting data between the content processor and each of the subscribers may be between about 1 millisecond and about 10 millisecond in some embodiments. Also, other delay values may be possible.

For example, as shown in FIG. 2, the tasks performed may include one or more of: dynamic QoS 202, policy management and/or maintenance 204, security processing 206, flow processing 208, classification processing 210, traffic shaping 212, critical task processing 214, job scheduling 216, monitoring processing 218, event processing 220, ingress content processing 222, egress content processing 224, monitoring processing 226, and/or data insertion processing 228. In an embodiment, the direction of arrows shown in FIG. 2 indicates the direction of data (including control data) flow.

Figure 3:
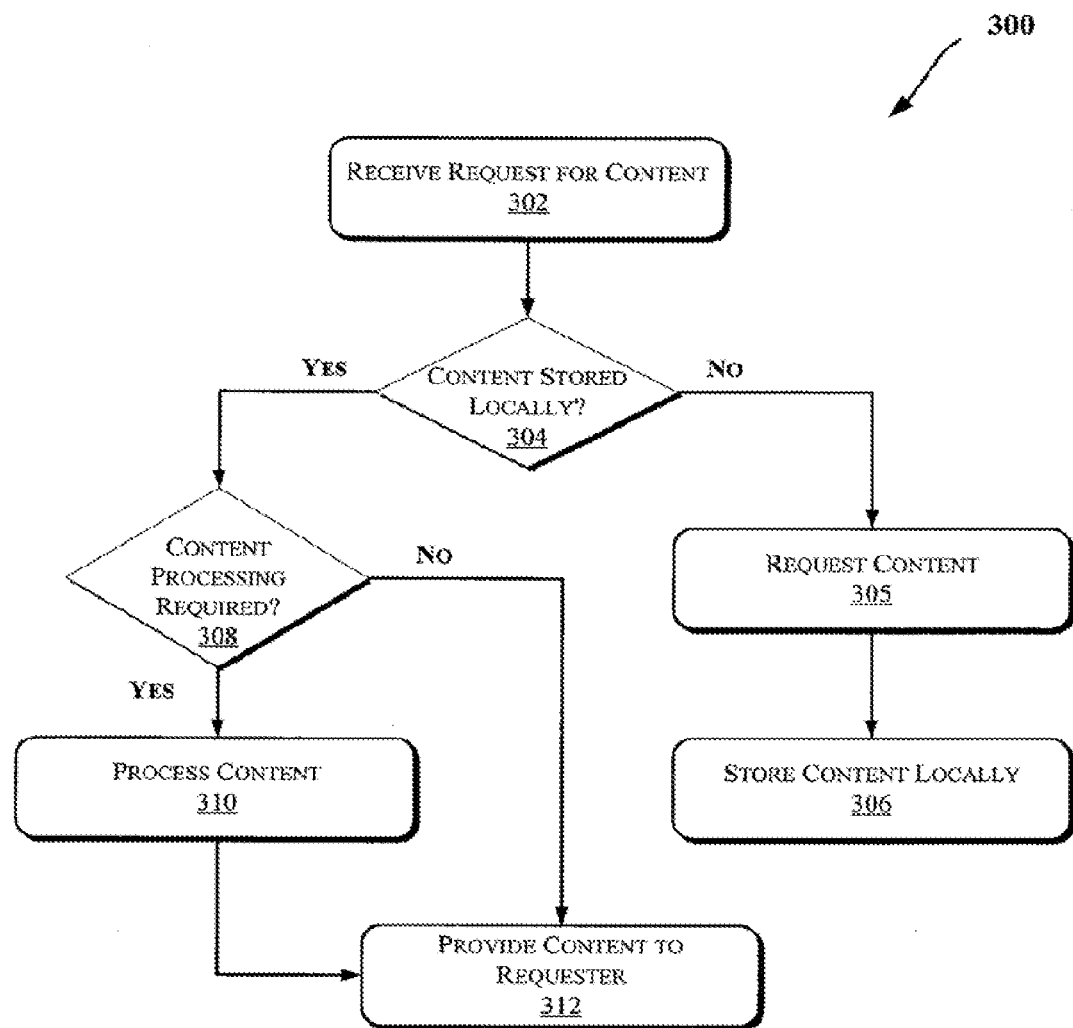
FIG. 3 illustrates a flow diagram of an embodiment of a method in accordance with an embodiment of the invention.

FIG. 3 illustrates a flow diagram of a method 300 to provide content to end users, according to an embodiment of the invention. Various operations discussed with reference to the method 300 may be performed by one or more components discussed herein, e.g., with reference to FIGS. 1-2 and 4-5.

Referring to FIGS. 1-3, at an operation 302, a request for information may be received (e.g., by one of the distributed content processors 104 from one of the subscribers 102). In an embodiment, attributes of the subscriber may also be transmitted as part of the request, or separately. Also, the attributes may have been previously provided and stored at one of the content processors 104 in some embodiments. For example, the attributes may indicate the requester's hardware attributes (such as display size, communication bandwidth capabilities, etc.), software attributes (such as operation system, applications, etc.), service subscription attributes (e.g., usage or bandwidth requirements defined based on a subscriber's agreement with a service provider), etc.

Additionally, the attributes may indicate the requester's personalized data, such as presence (e.g., location of the user), authentication (e.g., who is the user), and/or user history information (e.g., what channel did they watch when). Canalization may be preformed of user preferences to build a user profile and the profile may be blended with regional statistics, for example, to create an ideal "Neilson Rating" that may be used to offer as a service to advertisers. In an embodiment, a secure firewall may be implemented for trusted content delivery and acceptance. At an operation 304, it may be determined whether the requested content is stored locally (e.g., stored at one of the distributed content processors 104). If the content is not stored locally, a request for the content may be made at an operation 305. For example, at operation 305, one of the distributed content processors 104 may request the content from the content services 106 through a request issued via the network 108. The retrieved content (e.g., retrieved in response to operation 305) may be stored locally (e.g., by one of the distributed content processors 104) at an operation 306.

If the content is stored locally (e.g., stored at one of the distributed content processors 104) at operation 304, an operation 308 may determine whether the stored content requires further processing. For example, if the content is not encrypted, it may be encrypted by one of the content processors 104 prior to transmission of the content to a requesting subscriber 102 (e.g., the requesting subscriber who requested the content via operation 302). If the content requires processing, an operation 310 may process the content (e.g., in accordance with subscriber attributes discussed with reference to operation 302). For example, audio/video files may be encrypted, trans-coded, adjusted in size and/or quality, etc. based on the requesting subscriber's attribute(s). Also, one of the content processors 104 may re-key encrypted content and/or trans-code the content (which may be collectively referred to as "trans-keying" herein) at operation 310 in some embodiments. After processing the content at operation 310 or determining that the content requires no further processing at operation 308, the method 300 may continue at an operation 312 which provides the content to the requesting subscriber.

In some embodiments, such as shown in FIG. 1 and discussed with reference to FIG. 3, NDI may distribute processing capability (e.g., the content processors 104) at the edge of a network 108 (e.g., at a point where aggregation of subscribers 102 meets network routing). In an embodiment, the content processors may include generic computer processors on the data plane, either in conjunction or separate from the control plane, such as the computing systems discussed with reference to FIGS. 4 and/or 5. Implementing this processing at the edge may address one or more of the following: (1) latency at high bandwidth I/O line rates; (2) Quality of Service (QoS) may be provided dynamically and/or guaranteed; (3) traffic shaping may be real time with blending of services; (4) ease of programming and provisioning; and/or (5) upgrades may be simplified. Moreover, using generic processors may reduce operating expenditures (OPex) and/or capital expenditures (CAPex).

Additionally, having intelligence at the edge of the network allows a wide varying range and dynamic QoS levels that may be implemented, monitored, and managed to efficiently stream services including video, data, or voice, tuned to the service level agreement. Providers will be able to guarantee to the user and content provider, bandwidth and response time to the matched purchasing agreements. Real time monitoring of the system, alarms, and events for multiple programs, applications, and content becomes simpler and more manageable. Also, NDI at the edge of the network is a unique and more secure way of providing deep packet inspection techniques and enhanced flow management techniques for premium quality and security of service experiences due to the real time nature of compute resources at the edge. Having multiple CPUs or cores enable the breakdown of an algorithm giving the opportunity to increase the processing capability and security due to the algorithm being spread out. For example, the same set of algorithms may be executed by more than one of the content processors 104 of FIG. 1 to perform the same or multiple functions. Hence, various algorithms may be parallelized (e.g., in a pipeline fashion) to improve computational speed and reduce latency. In an embodiment, one or more of the compute cores of the content processors 104 may be configured as a job schedulers or load balancers to indicate which operations each of the compute core is to run.

The network architecture 100 of FIG. 1 may be used in a variety of applications. In networking applications, for example, it is possible to closely couple packet processing and general purpose processing for optimal, high-throughput communication between packet processing elements of a network processor (e.g., a processor that processes data communicated over a network, for example, in form of data packets) and the control and/or content processing elements.

Figure 4:
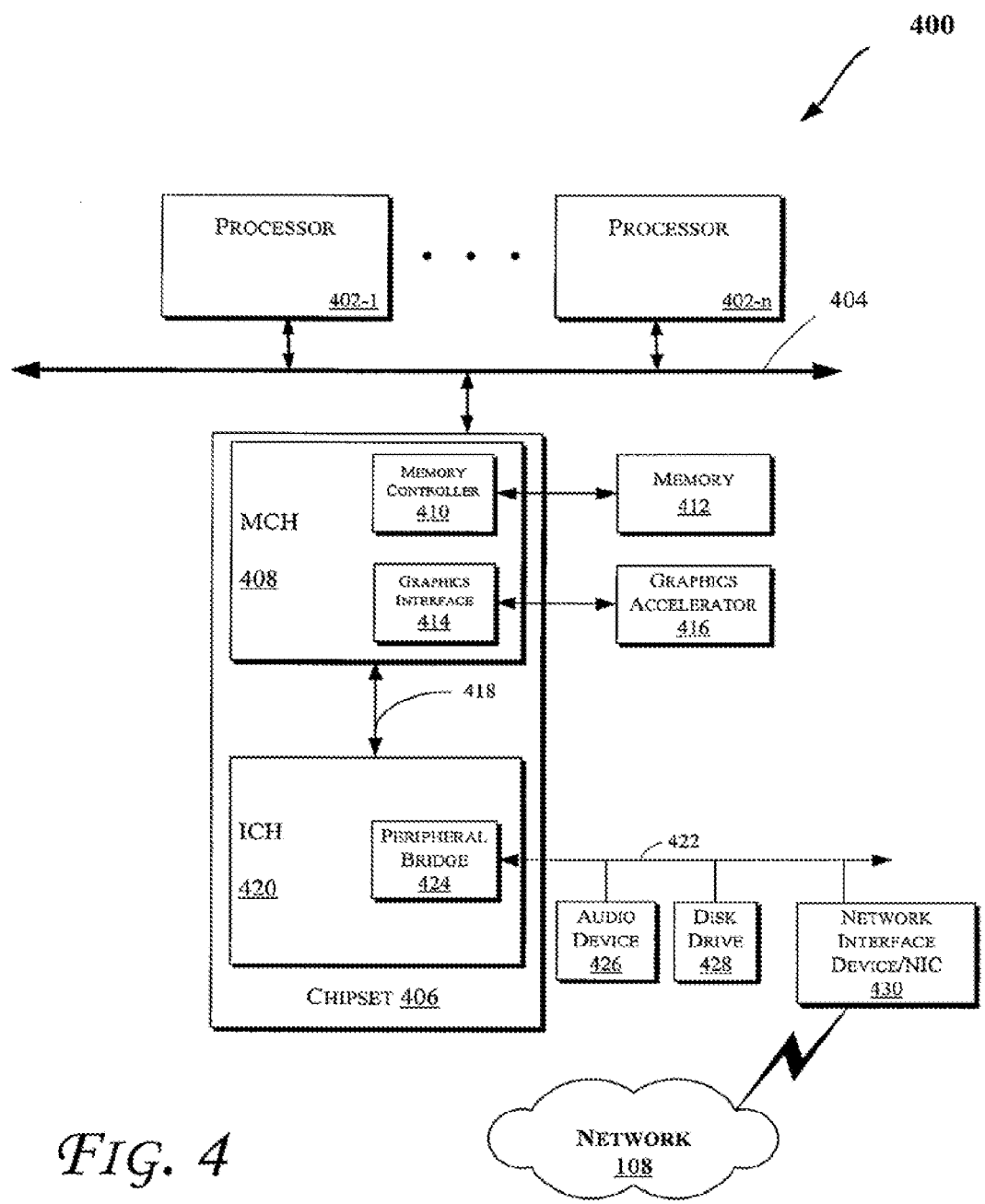
FIGS. 4 and 5 illustrate block diagrams of computing systems in accordance with various embodiments of the invention.

FIG. 4 illustrates a block diagram of a computing system 400 in accordance with an embodiment of the invention. The computing system 400 may include one or more central processing unit(s) (CPUs) 402 or processors coupled to an interconnection network (or bus) 404. The processors (502) may be any suitable processor such as a network processor (that processes data communicated over a computer network 108) or the like (including a reduced instruction set computer (RISC) processor or a complex instruction set computer (CISC)). Moreover, the processors (502) may have a single or multiple core design. The processors (502) with a multiple core design may integrate different types of processor cores on the same integrated circuit (IC) die. Also, the processors (502) with a multiple core design may be implemented as symmetrical or asymmetrical multiprocessors. Furthermore, the processor(s) 402 may optionally include one or more of the processor cores 106 and/or the processor 102. Additionally, the operations discussed with reference to FIGS. 1-4 may be performed by one or more components of the system 400.

A chipset 406 may also be coupled to the interconnection network 404. The chipset 406 may include a memory control hub (MCH) 408. The MCH 408 may include a memory controller 410 that is coupled to a memory 412. The memory 412 may store data and sequences of instructions that are executed by the processor(s) 402, or any other device included in the computing system 400. In one embodiment of the invention, the memory 412 may include one or more volatile storage (or memory) devices such as random access memory (RAM), dynamic RAM (DRAM), synchronous DRAM (SDRAM), static RAM (SRAM), or the like. Non-volatile memory may also be utilized such as a hard disk. Additional devices may be coupled to the interconnection network 404, such as multiple CPUs and/or multiple system memories.

The MCH 408 may also include a graphics interface 414 coupled to a graphics accelerator 416. In one embodiment of the invention, the graphics interface 414 may be coupled to the graphics accelerator 416 via an accelerated graphics port (AGP). In an embodiment of the invention, a display (such as a flat panel display) may be coupled to the graphics interface 414 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display.

A hub interface 418 may couple the MCH 408 to an input/output control hub (ICH) 420. The ICH 420 may provide an interface to I/O devices coupled to the computing system 400. The ICH 420 may be coupled to a bus 422 through a peripheral bridge (or controller) 424, such as a peripheral component interconnect (PCI) bridge, a universal serial bus (USB) controller, or the like. The bridge 424 may provide a data path between the CPU 402 and peripheral devices. Other types of topologies may be utilized. Also, multiple buses may be coupled to the ICH 420, e.g., through multiple bridges or controllers. Moreover, other peripherals coupled to the ICH 420 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or the like.

The bus 422 may be coupled to an audio device 426, one or more disk drive(s) 428, and a network interface device 430 (which is coupled to the computer network 108). In one embodiment, the network interface device 430 may be a network interface card (NIC). Other devices may be coupled to the bus 422. Also, various components (such as the network interface device 430) may be coupled to the MCH 408 in some embodiments of the invention. In addition, the processor 402 and the MCH 408 may be combined to form a single chip. Furthermore, the graphics accelerator 416 may be included within the MCH 408 in other embodiments of the invention.

Additionally, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media suitable for storing electronic instructions and/or data.

Figure 5:
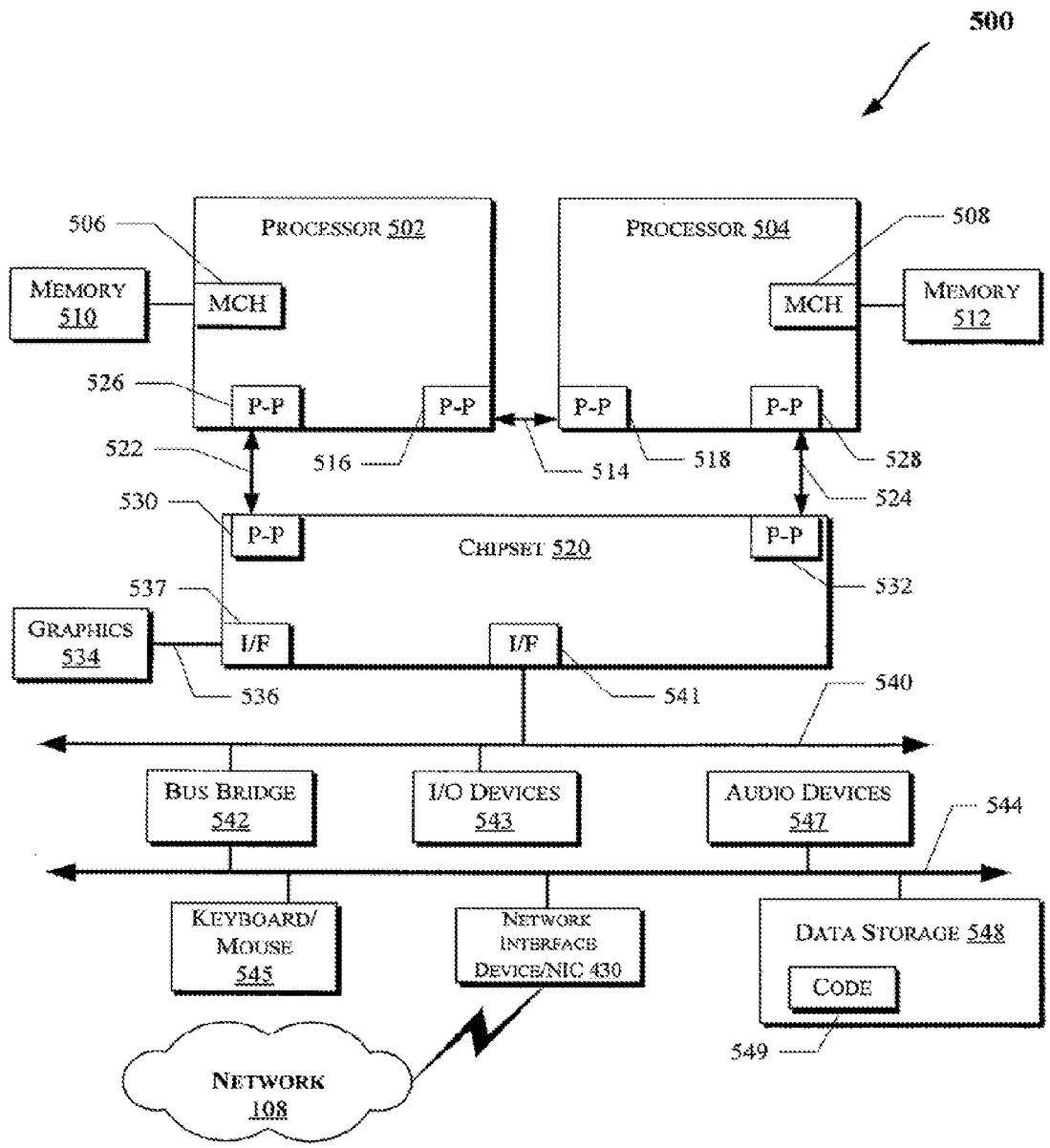

FIG. 5 illustrates a computing system 500 that is arranged in a point-to-point (PtP) configuration, according to an embodiment of the invention. In particular, FIG. 5 shows a system where processors, memory, and input/output devices are interconnected by a number of point-to-point interfaces. The operations discussed with reference to FIGS. 1-5 may be performed by one or more components of the system 500.

As illustrated in FIG. 5, the system 500 may include several processors, of which only two, processors 502 and 504 are shown for clarity. The processors 502 and 504 may each include a local memory controller hub (MCH) 506 and 508 to couple with memories 510 and 512. The memories 510 and/or 512 may store various data such as those discussed with reference to the memory 412 of FIG. 4.

The processors 502 and 504 may be any suitable processor such as those discussed with reference to the processors 402 of FIG. 4. The processors 502 and 504 may exchange data via a point-to-point (PtP) interface 514 using PtP interface circuits 516 and 518, respectively. The processors 502 and 504 may each exchange data with a chipset 520 via individual PtP interfaces 522 and 524 using point to point interface circuits 526, 528, 530, and 532. The chipset 520 may also exchange data with a high-performance graphics circuit 534 via a high-performance graphics interface 536, using a PtP interface circuit 537.

At least one embodiment of the invention may be provided by utilizing the processors 502 and 504. For example, the processors 502 and/or 504 may perform one or more of the operations of FIG. 3. Other embodiments of the invention, however, may exist in other circuits, logic units, or devices within the system 500 of FIG. 5. Furthermore, other embodiments of the invention may be distributed throughout several circuits, logic units, or devices illustrated in FIG. 5.

The chipset 520 may be coupled to a bus 540 using a PtP interface circuit 541. The bus 540 may have one or more devices coupled to it, such as a bus bridge 542 and I/O devices 543. Via a bus 544, the bus bridge 542 may be coupled to other devices such as a keyboard/mouse 545, the network interface device 430 discussed with reference to FIG. 4 (such as modems, network interface cards (NICs), or the like that may be coupled to the computer network 108), audio I/O device, and/or a data storage device 548. The data storage device 548 may store code 549 that may be executed by the processors 502 and/or 504.

In various embodiments of the invention, the operations discussed herein, e.g., with reference to FIGS. 1-5, may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include any suitable storage device such as those discussed with respect to FIGS. 4 and 5.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A system comprising:
one or more content processors to:
receive media content;
receive, from a client device, a request identifying the media content;
generate customized media content, the customized media content being generated by adjusting the quality of the media content, the customized media content being customized by the one or more content processors for use by the client device in accordance with one or more attributes associated with the client device, the one or more attributes including one or more software attributes of the client device; and
provide, as streaming media content in accordance with the one or more attributes associated with the client device, the customized media content to the client device, the streaming media content being encrypted by the one or more content processors in a manner determined, at least in part, by the one or more attributes associated with the client device.

2. The system of claim 1, the one or more content processors to further encrypt the customized media content prior to providing the customized media to the client device.

3. The system of claim 1, wherein the customized media content is further generated by transcoding the customized media content in response to the request identifying the media service.

4. The system of claim 1, wherein the one or more attributes associated with the client device comprise a communication bandwidth capability.

5. The system of claim 1, further comprising receiving the one or more attributes associated with the client device in a transmission that is separate from the request identifying the media content.

6. The system of claim 1, wherein the media content is transcoded to adjust the quality of the media content.

7. At least one non-transitory machine accessible storage medium storing code, the code when executed by a machine resulting the machine being capable of performing operations comprising:
  receiving media content;
  receiving, from a client device, a request identifying the media content;
  generating customized media content, the customized media content being generated by adjusting the quality of the media content, the customized media content being customized for use by the client device in accordance with one or more attributes associated with the client device, the one or more attributes including one or more software attributes of the client device; and
  providing, as streaming media content in accordance with the one or more attributes associated with the client device, the customized media content to the client device, the streaming media content being encrypted in a manner determined, at least in part, by the one or more attributes associated with the client device.

8. The medium of claim 7, wherein the customized media content is encrypted.

9. The medium of claim 8, wherein the customized media content is encrypted after the receiving of the request from the client device.

10. The medium of claim 9, wherein the customized media content is further generated by transcoding the customized media content in response to the request identifying the media service.

11. The medium of claim 9, wherein the one or more attributes associated with the client device comprise a communication bandwidth capability.

12. The medium of claim 9, wherein the adjusting the quality of the first media content occurs through a transcoding of the media content.

13. A method comprising:
  receiving media content;
  receiving, from a client device, a request identifying the media content;
  generating a customized media content, the customized media content being generated by adjusting the quality of the media content, the customized media content being customized for use by the client device in accordance with one or more attributes associated with the client device, the one or more attributes associated with the client device including one or more software attributes of the client device; and
  providing, as streaming media content in accordance with the one or more attributes associated with the client device, the customized media content to the client device, the streaming media content being encrypted in a manner determined, at least in part, by the one or more attributes associated with the client device.

14. The method of claim 13, wherein the customized media content is encrypted.

15. The method of claim 13, wherein the customized media content is encrypted after the receiving of the request from the client device.

16. The method of claim 13, wherein the customized media content is further generated by encrypting the customized media content in accordance with at least one of the one or more attributes of the client device.

17. The method of claim 13, wherein the customized media content is further generated by transcoding after quality adjustment in response to the request.

18. The method of claim 13, wherein the one or more attributes associated with the client device comprise a communication bandwidth capability.

19. The method of claim 13, further comprising receiving the one or more attributes of the client in a transmission that is separate from the request identifying the media content.

20. The method of claim 13, wherein the adjusting the quality of the first media content occurs through a transcoding of the media content.

21. A system comprising:
  one or more content processors to:
    receive a media service comprising first media content;
    receive, from a client device, a request identifying the first media content;
    generate a customized service comprising second media content, the second media content being generated by adjusting the quality of the first media content, the second media content being customized by the one or more content processors for use by the client device in accordance with one or more attributes associated with the client device, the one or more attributes including one or more software attributes of the client device; and
    provide the customized service to the client device, the customized service comprising provision of streaming media content in accordance with the one or more attributes associated with the client device, the streaming media content being encrypted by the one or more content processors in a manner determined, at least in part, by the one or more attributes associated with the client device.

22. The system of claim 21, wherein the second media content is further generated by encrypting the quality-adjusted first media content in accordance with at least one of the one or more attributes associated with the client device.

23. The system of claim 21, wherein the second media content is further generated by transcoding the quality-adjusted first media content in response to the request identifying the media service.

24. The system of claim 21, wherein the one or more attributes associated with the client device comprise a communication bandwidth capability.

25. The system of claim 21, wherein the first media content is transcoded to adjust the quality of the first media content.

26. At least one non-transitory machine accessible storage medium storing code, the code when executed by a machine resulting in the machine being capable of performing operations comprising:
  receiving a media service comprising first media content;
  receiving, from a client device, a request identifying the media service;

generating a customized service comprising second media content, the second media content being customized for use by the client device and being generated by adjusting the quality of the first media content, the second media content being in accordance with one or more attributes associated with the client device, the one or more attributes including one or more software attributes of the client device; and providing the customized service to the client device, the customized service comprising provision of streaming media content in accordance with the one or more attributes associated with the client device, the streaming media content being encrypted by the one or more content processors in a manner determined, at least in part, by the one or more attributes associated with the client device.

27. The medium of claim 26, wherein the second media content is further generated by encrypting the quality-adjusted first media content.

28. The medium of claim 27, wherein the encrypting the quality-adjusted first media content is performed after receiving the request from the client device.

29. The medium of claim 26, wherein the second media content is further generated by transcoding the quality-adjusted first media content in response to the request identifying the media service.

30. A method comprising:

receiving a media service comprising first media content;

receiving, from a client device, a request identifying the media service;

generating a customized service comprising second media content, the second media content being customized for use by the client device and being generated by adjusting the quality of the first media content, the second media content being in accordance with one or more attributes associated with the client device, the one or more attributes including one or more software attributes of the client device; and providing the customized service to the client device, the customized service comprising provision of streaming media content in accordance with the one or more attributes associated with the client device, the streaming media content being encrypted by the one or more content processors in a manner determined, at least in part, by the one or more attributes associated with the client device.

31. The method of claim 30, wherein the second media content is further generated by encrypting the quality-adjusted first media content.

32. The method of claim 31, wherein the encrypting the quality-adjusted first media content is performed after receiving the request from the client device.

33. The method of claim 30, wherein the second media content is further generated by encrypting the quality-adjusted first media content in accordance with at least one of the one or more attributes of the client device.

34. The method of claim 30, wherein the second media content is further generated by transcoding the quality-adjusted first media content in response to the request identifying the media service.

35. The method of claim 30, wherein the one or more attributes associated with the client device comprise a communication bandwidth capability.

36. The method of claim 30, wherein the adjusting the quality of the first media content occurs through a transcoding of the first media content.

37. At least one non-transitory machine accessible storage medium storing code, the code when executed by a machine resulting in the machine being capable of performing operations comprising:

receiving media content;

receiving, from a client device, a request identifying the media content;

generating customized media content, the customized media content being generated by adjusting the quality of the media content, the customized media content being customized for use by the client device in accordance with one or more attributes associated with the client device, the one or more attributes including one or more software attributes of the client device; and providing, as streaming media content in accordance with the one or more attributes associated with the client device, the customized media content to the client device, the streaming media content being encrypted in a manner determined, at least in part, by the one or more attributes associated with the client device.

\* \* \* \* \*